(12) United States Patent
Nagamatsu et al.

(10) Patent No.: US 6,544,413 B1
(45) Date of Patent: Apr. 8, 2003

(54) SIMULATED MOVING BED DEVICE

(75) Inventors: Shinji Nagamatsu, Niigata (JP); Oliver Ludemann-Hombourger, Chavigny (FR); Julien Filou, Nancy (FR)

(73) Assignees: Daicel Chemical Industries, Ltd., Osaka (JP); Novasep, Pompey (FR)

( * ) Notice: Subject to any disclaimer, the term of this patent is extended or adjusted under 35 U.S.C. 154(b) by 0 days.

(21) Appl. No.: 09/869,574

(22) PCT Filed: Nov. 2, 2000

(86) PCT No.: PCT/JP00/07733

§ 371 (c)(1),
(2), (4) Date: Oct. 9, 2001

(87) PCT Pub. No.: WO01/33210

PCT Pub. Date: May 10, 2001

(30) Foreign Application Priority Data

Nov. 2, 1999 (JP) .................................................. 11-312182

(51) Int. Cl.[7] .............................................. B01D 35/157
(52) U.S. Cl. ........................ 210/142; 210/264; 210/511; 422/115; 422/142; 422/190
(58) Field of Search ........................ 210/98, 142, 143, 210/198.2, 264, 269, 277, 278, 511, 656, 659, 662, 670, 677, 678; 585/822, 825; 422/70, 114, 115, 116, 142, 190

(56) References Cited

U.S. PATENT DOCUMENTS 5,635,072 A  6/1997  Moran ........................ 210/659
6,004,518 A * 12/1999  Green ........................ 422/142
6,149,874 A * 11/2000  Hotier ........................ 422/142

FOREIGN PATENT DOCUMENTS

| EP | 0687491 | 12/1995 |
| JP | 3134562 | 6/1991 |
| JP | 7328305 | 12/1995 |
| WO | WO996339 | 12/1999 |

* cited by examiner

Primary Examiner—Joseph W. Drodge
(74) Attorney, Agent, or Firm—Birch, Stewart, Kolasch & Birch, LLP

(57) ABSTRACT

This invention provides an ultra-micro simulated moving bed apparatus employing valve devices, each of which is applied to each unit column and comprises an eluent valve that opens or closes a first communication passage connecting an eluent feeding cul-de-sac passage with the circulation passage, an extract valve that opens or closes a second communication passage connecting an extract draw-out cul-de-sac passage with the circulation passage, a feedstock mixture valve that opens or closes a third communication passage connecting a feedstock mixture feeding cul-de-sac passage with the circulation passage, and a raffinate valve that opens or closes a fourth communication passage connecting a raffinate draw-out cul-de-sac passage with the circulation passage. By employment of the valve devices can be provided an ultra-micro simulated moving bed apparatus that has a small volume of the fluid flowable spaces, good operation stability, quick return to a stable operation after changing the operation conditions, and high separation efficiency.

9 Claims, 3 Drawing Sheets

SIMULATED MOVING BED DEVICE

This application is the national phase under 35 U.S.C. §371 of PCT International Application No. PCT/JP00/07733 which has and International filing date of Nov. 2, 2000, which designated the United States of America and was not published in English.

TECHNICAL FIELD

The present invention relates to a simulated moving bed apparatus. More particularly, this invention relates to a simulated moving bed apparatus that can be operated stably, and moreover can regain stable functioning without troubles shortly after operating conditions are changed. The apparatus can separate plural components with high separation efficiency, while it can be designed to have an ultra small size.

BACKGROUND ART

A conventional simulated moving bed apparatus comprises plural unit packed beds, which are also called unit columns, packed with a filler, said plural unit packed beds having a fore-end and a back-end, said back-end of one bed being connected with said fore-end of the next bed via a conduit and thus said unit packed beds being connected in series with each other to form an endless circulation passage, through which fluid is circulated unidirectionally, wherein a feedstock mixture and an eluent are introduced into said circulation passage, and at the same time a liquid mixture containing a substance separated from the filler and another liquid mixture containing other substances are drawn out from said circulation passage; and each of said unit packed beds being provided with an introducing port for introducing the eluent, a draw-out port for drawing out a strongly adsorbed substance, which is called an extract, an introducing port for introducing the feedstock mixture, and a draw-out port for drawing out a weakly adsorbed substance, which is called a raffinate, wherein one of said eluent introducing ports, one of said extract draw-out ports, one of said feedstock mixture introducing ports and one of said raffinate draw-out ports are on in this order along the direction of fluid circulation, and said working positions of the ports are successively shifted in the direction of fluid circulation intermittently with a switching device.

Conventional simulated moving bed apparatuses having such a structure were adapted to low-pressure operation. They were used for large-scale separation of sugar. Recently, highly efficient fillers that have a small particle diameter and therefore are capable of carrying out accurate separation have been developed. With a simulated moving bed apparatus of which columns are packed with such highly efficient fillers was started carrying out, under high pressure, separations including optical resolution of, for example, medicines.

As the apparatus has become widely used, are desired ultra-micro simulated moving bed apparatuses used for obtaining basic data for scaling up or for carrying out a separation of a small amount sample. For screening medicines and carrying out pre-clinical examinations, there is a large demand for small-amount sample separation apparatuses.

When a conventional apparatus having the aforementioned structure is simply miniaturized, however, the content volume of the space in the system (Vs) becomes large compared with the content volume of the columns (Vc). This problem results from the fact that it is difficult to miniaturize conventional pumps and switching valves in proportion to the reduction of the whole apparatus size, with the strength against the high pressure being maintained. Another reason is that there is a limit to the minimization of the inner diameter of the conduits, because the inner diameter has to be large enough to prevent the conduits from blocking. For example, in a comparatively small-sized simulated moving bed apparatus employing unit columns each of which has a content volume of about 1,000 $cm^3$, Vs/Vc is approximately 5%. On the other hand, if a simulated moving bed apparatus provided with unit columns each of which has a content volume of about 10 $cm^3$ is made under the design idea of simply scaling down the apparatus size, Vs/Vc is several tens percent. When the value of Vs/Vc is large, the separation efficiency of a sample is lowered due to diffusion of the target substance inside the system. Besides, the operation stability of the simulated moving bed apparatus is reduced.

In order to minimize Vs in small-sized simulated moving bed apparatuses have often been used rotary valves as a switching device. When a rotary valve is changed over, however, fluctuation in the pressure in the system occurs. When a simulated moving bed apparatus is operated under a high pressure, such fluctuation in the system's pressure is a fatal cause of obstructing the stable operation. So, in conventional apparatuses pressure dampers were used to absorb such pressure fluctuation. For ultra-micro simulated moving bed apparatuses that tend to have a large Vs, however, it is difficult to employ such pressure dampers from the viewpoint of minimizing Vs.

As a pump that is incorporated in the simulated moving bed apparatus was often used a diaphragm pump, which has a drawback of causing a pulsation. For overcoming this problem diaphragm pumps with 3 or more heads have to be employed. Although this employment solves the pulsation, it creates another problem; it makes Vs larger. Also, the incorporation of a diaphragm pump into an ultra-micro simulated moving bed apparatus provided with unit columns each of which has a content volume of about 10 $cm^3$ is in itself technically difficult.

Although the use of conduits having a small inner diameter might theoretically be considered to make an ultra-micro apparatus, it has a limit as a realistic technology.

The object of this invention is to solve the aforementioned problems. The objective of the invention is to provide an ultra-micro-sized simulated moving bed apparatus that exhibits acceptable operation stability under practical operating conditions, can regain a stable functioning shortly after the operation conditions are changed, and is capable of separating components with high purity.

Another objective of the invention is to provide an ultra-micro-sized simulated moving bed apparatus that can separate the components with high purity when the amount of the sample is small, exhibit acceptable operation stability under practical operating conditions, regain a stable functioning shortly after the operation conditions are changed, and does not give pulsation to the circulating fluid.

A further objective of the invention is to provide an ultra-micro-sized simulated moving bed apparatus that can separate the components with high purity when the amount of the sample is small, and has such a size as to be able to be placed on an experiment table in a laboratory and convenient for obtaining basic data necessary for scaling up.

SUMMARY OF THE INVENTION

This invention provides a simulated moving bed apparatus which comprises:

a circulation passage formed by plural unit columns that are connected in series to each other endlessly via a conduit for allowing unidirectional circulation of a circulation fluid through the connected filler columns by a circulation pump;

an eluent feeding cul-de-sac passage for feeding an eluent to said circulation passage;

a feedstock mixture feeding cul-de-sac passage for feeding a feedstock mixture to said circulation passage;

a raffinate draw-out cul-de-sac passage for drawing out a raffinate from said circulation passage;

an extract draw-out cul-de-sac passage for drawing out an extract from said circulation passage;

plural valve devices, each comprising an eluent valve which opens or closes a first communication passage that connects said eluent feeding cul-de-sac passage with said circulation passage, an extract valve which opens or closes a second communication passage that connects said extract draw-out cul-de-sac passage with said circulation passage, a feedstock mixture valve which opens or closes a third communication passage that connects said feedstock mixture feeding cul-de-sac passage with said circulation passage, and a raffinate valve which opens or closes a fourth communication passage that connects said raffinate draw-out cul-de-sac passage with said circulation passage, wherein each of said unit columns is provided with each of said valve devices; and a control device which controls opening and closing motions of said feedstock mixture valve, said eluent valve, said extract valve and said raffinate valve so that the position for introducing said eluent, the position for drawing out said extract, the position for introducing said feedstock mixture and the position for drawing out said raffinate are successively moved in the direction of the fluid flow intermittently.

In the simulated moving bed apparatus, said plural valve devices are each provided with fluid passages connected with said first, second, third and fourth communication passages, wherein said fluid passages form part of said circulation passage.

In the simulated moving bed apparatus, said valve devices are incorporated into one or more units so that all of the valve devices communicate with the same one eluent feeding cul-de-sac passage, one feedstock mixture feeding cul-de-sac passage, one raffinate draw-out cul-de-sac passage and one extract draw-out cul-de-sac passage.

In the simulated moving bed apparatus, said plural valve devices are grouped and incorporated into two units so that every other valve device along said circulation passage is grouped one of the two units, wherein all of the valve devices in the same group communicate with the same one eluent feeding cul-de-sac passage, one feedstock mixture feeding cul-de-sac passage, one raffinate draw-out cul-de-sac passage and one extract draw-out cul-de-sac passage.

In the simulated moving bed apparatus, said each of valve devices comprises an eluent passage that forms a part of said eluent feeding cul-de-sac passage, an extract passage that forms a part of said extract draw-out cul-de-sac passage, a feedstock mixture passage that forms a part of said feedstock mixture feeding cul-de-sac passage and a raffinate passage that forms a part of raffinate draw-out cul-de-sac passage; and said eluent valve comprises a first valve element that is capable of opening and closing said first communication passage and does not close said eluent passage when said first communication passage is closed, said extract valve comprises a second valve element that is capable of opening and closing said second communication passage and does not close said extract passage when said second communication passage is closed, said feedstock mixture valve comprises a third valve element that is capable of opening and closing said third communication passage and does not close said feedstock mixture passage when said third communication passage is closed, and said raffinate valve comprises a fourth valve element that is capable of opening and closing said fourth communication passage and does not close said raffinate passage when said fourth communication passage is closed.

In the simulated moving bed apparatus, each of said valve devices includes:

a first hollow cylinder communicating with said first communication passage and said eluent passage respectively, and a first plunger sealingly fitting into said first hollow cylinder, said first plunger being movable backward and forward therein;

a second hollow cylinder communicating with said second communication passage and said extract passage respectively, and a second plunger sealingly fitting into said second hollow cylinder, said second plunger being movable backward and forward therein;

a third hollow cylinder communicating with said third communication passage and said feedstock mixture passage respectively, and a third plunger sealingly fitting into said third hollow cylinder, said third plunger being movable backward and forward therein; and a fourth hollow cylinder communicating with said fourth communication passage and said raffinate passage respectively, and a fourth plunger sealingly fitting into said fourth hollow cylinder, said fourth plunger being movable backward and forward therein.

In the simulated moving bed apparatus, said circulation pump is a pump for circulating the circulation fluid and the amount of flowing fluid through said pump can be set; said eluent feeding cul-de-sac passage is connected with an eluent pump for feeding an eluent and of which amount of outflowing said eluent can be set; said extract draw-out passage is connected with an extract pump for drawing out an extract and of which amount of inflowing the extract can be set; said feedstock mixture feeding cul-de-sac passage is connected with a feedstock mixture pump for feeding a feedstock mixture and of which amount of outflowing the feedstock mixture can be set; and said raffinate draw-out passage is connected with a raffinate pump for drawing out a raffinate and of which amount of inflowing the raffinate can be set.

In the simulated moving bed apparatus, said circulation pump, said eluent pump, said extract pump, said feed stock mixture pump and said raffinate pump are double plunger pumps.

In the simulated moving bed apparatus, said apparatus measures 1 m or less in height, 1 m or less in width, and 1 m or less in length.

BEST MODES FOR CARRYING OUT THE INVENTION

Figure 1:
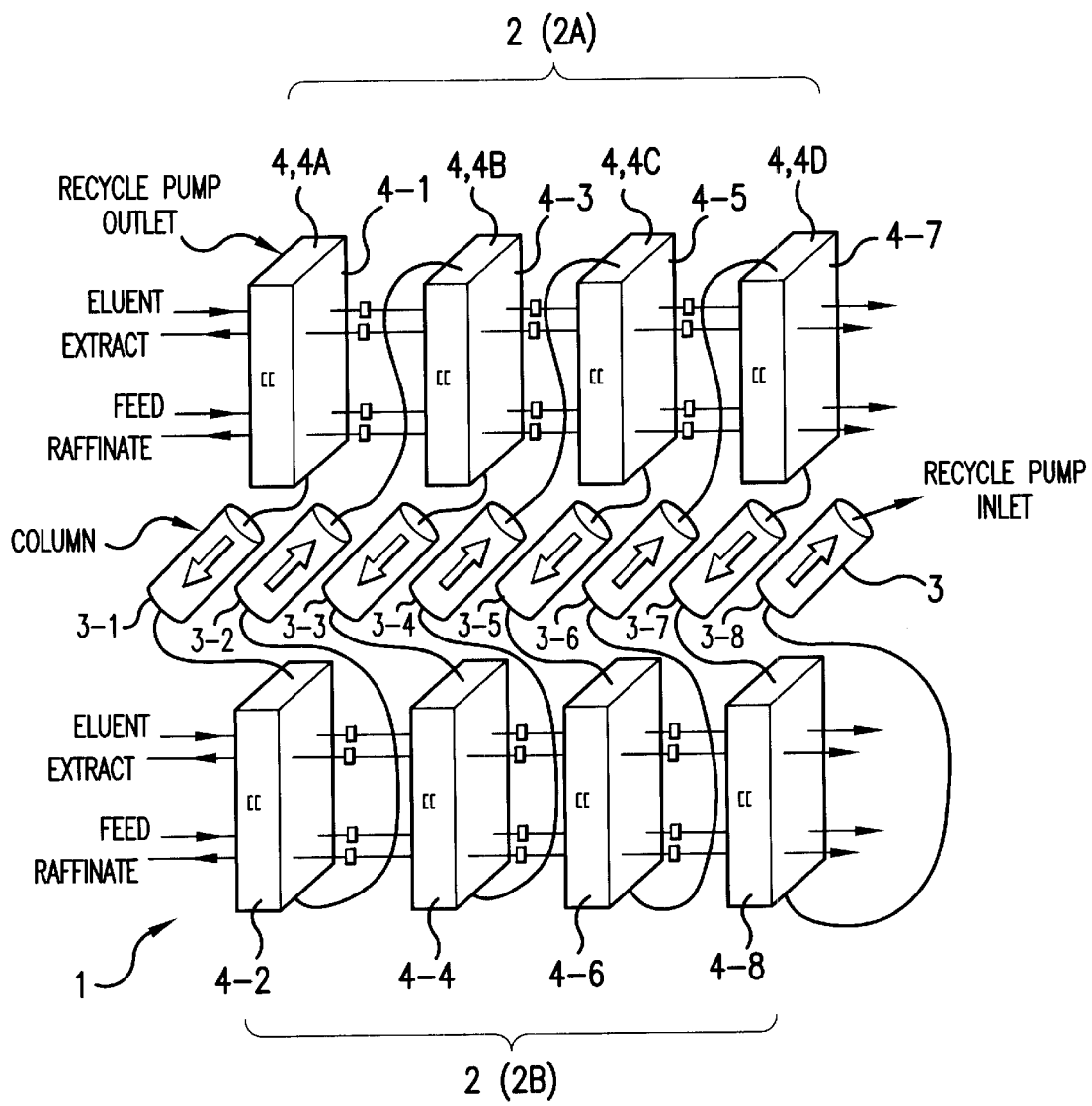
FIG. 1 is a schematic illustration of a simulated moving bed apparatus that is an embodiment of the present invention.

A schematic illustration of a simulated moving bed apparatus that is an embodiment of the present invention is shown in FIG. 1. As shown in the figure, simulated moving bed apparatus 1 is provided with two units 2 into each of which four valve devices 4 are incorporated, eight unit columns 3, a circulation pump (not shown) and a controlling device (not shown) that controls valve devices 4 in the respective units 2.

Two units 2 have the identical structure. Each of units 2 has four valve devices 4 that are incorporated into one unit through a very close placement thereof.

As shown in FIG. 1, of the four valve devices, valve device 4 that is placed near a feedstock mixture feeding device for feeding the feedstock mixture, an eluent feeding device for feeding the eluent, an extract draw-out device for drawing out the extract and a raffinate draw-out device for drawing out the raffinate is named spearhead valve device 4A. The two valve devices 4 following spearhead valve device 4A are named middle valve devices 4B. The fourth valve device 4 is named tail-end valve device 4C.

Figure 2:
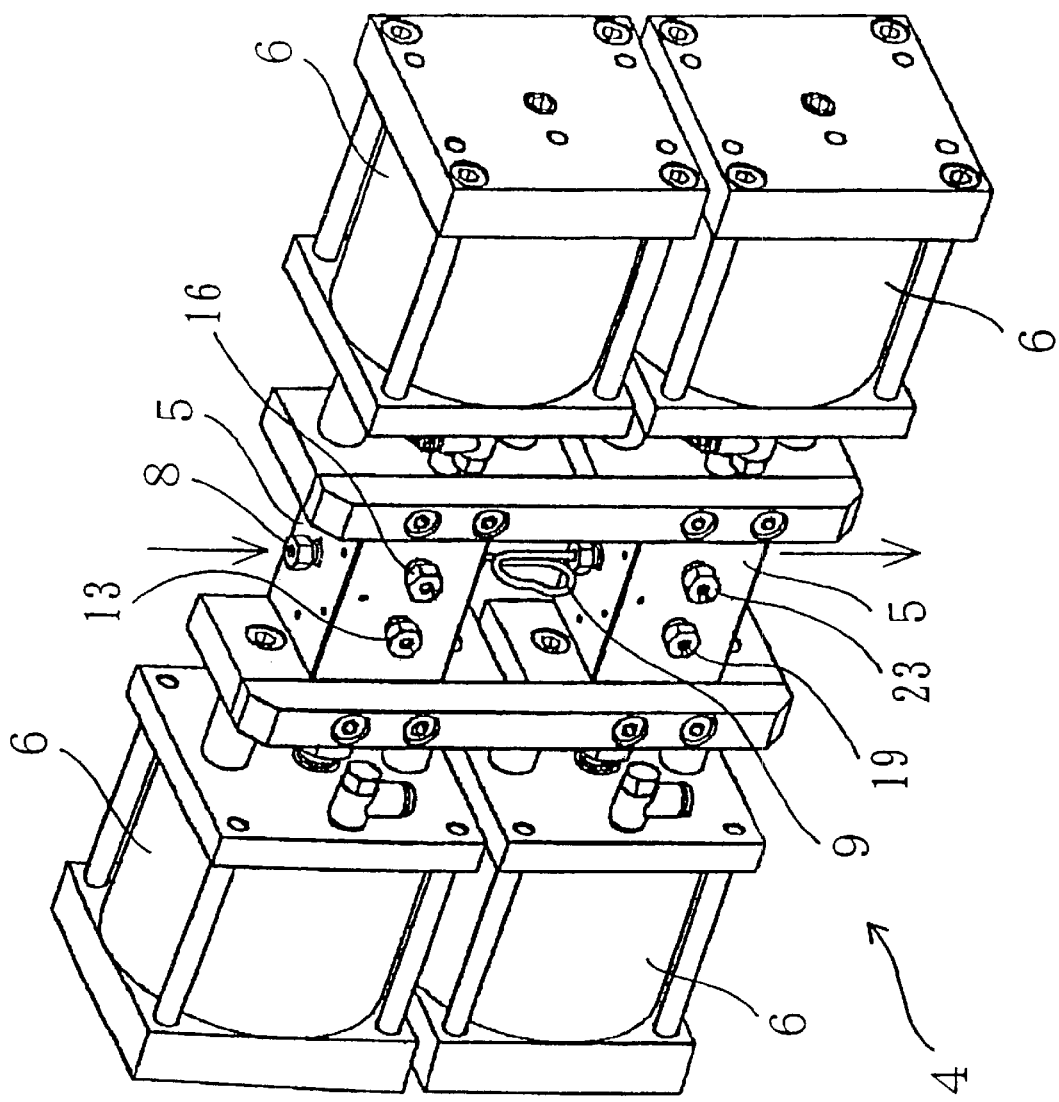
FIG. 2 is a perspective illustration of valve devices that are incorporated into a simulated moving bed apparatus, which is an embodiment of the present invention.

As shown in FIG. 2, each of four valve devices 4 has a pair of cylinder boxes 5 arranged vertically. Each cylinder box has a pair of electromagnetic valve devices 6 on both sides thereof so that the cylinder box is sandwiched between the electromagnetic valve devices.

Figure 3:
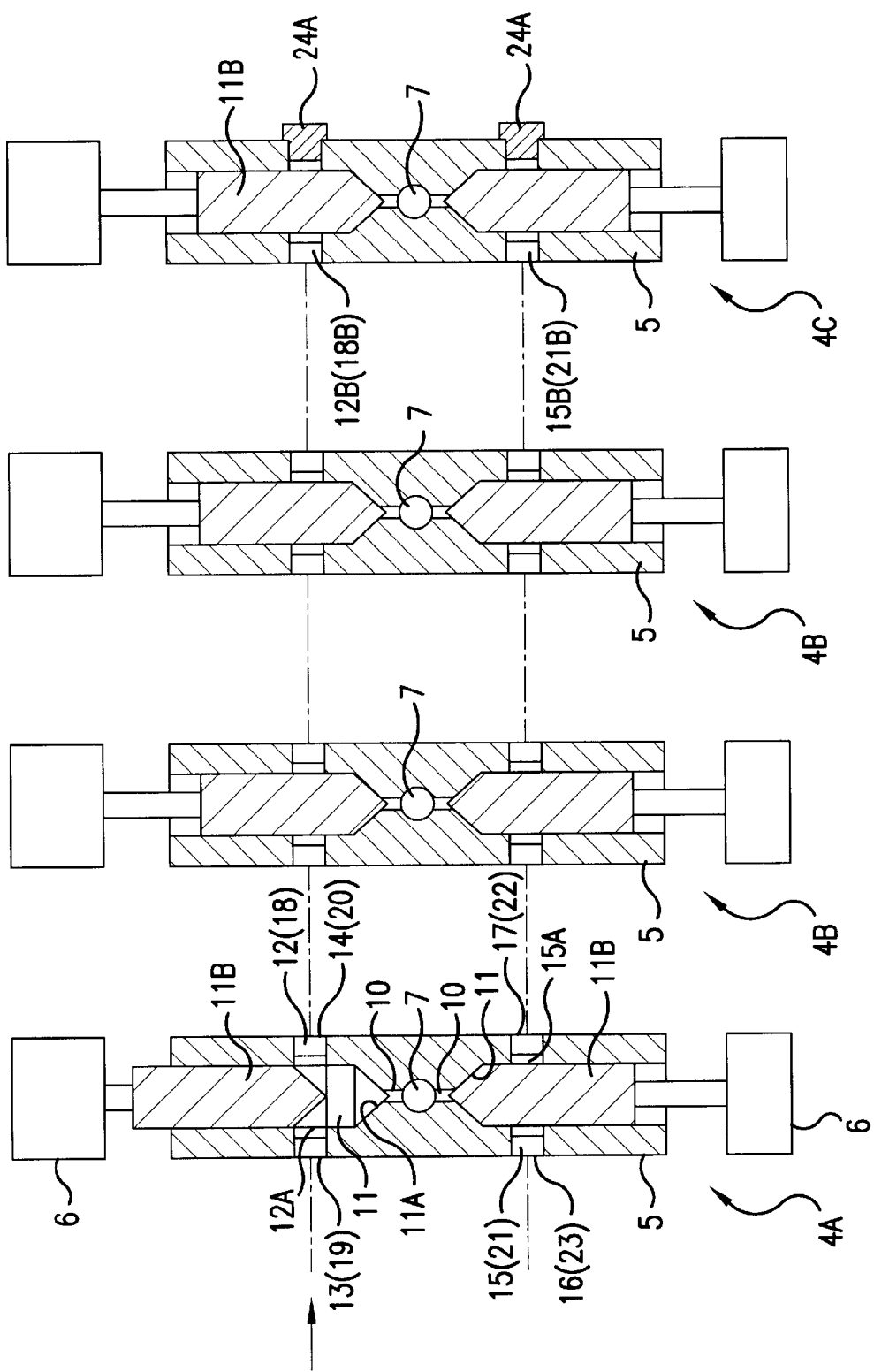
FIG. 3 is a horizontal sectional view of valve devices incorporated into units, which units in turn are incorporated into a simulated moving bed apparatus, which is an embodiment of the present invention.

As shown in FIG. 3, each of cylinder boxes 5 has fluid passage 7 for allowing the circulation fluid to flow therethrough. As shown in FIG. 2, the upper face of the lower cylinder box 5 has circulation fluid inlet 8 for introducing the circulation fluid into fluid passage 7. In the bottom face of the upper cylinder box 5 is pierced a circulation fluid outlet (not shown) for discharging the circulation fluid.

The circulation fluid outlet of the upper cylinder box 5 is connected with circulation fluid inlet 8 of the lower cylinder box 5 via a conduit such as pipe 9.

As understood from FIG. 3, spearhead valve device 4A and middle valve devices 4B have the same structure. Therefore, we will explain the structure and functions of one of them, instead of explaining those of each of them.

Of vertically arranged cylinder boxes 5, the upper cylinder box 5 has a pair of communication passages 10 that are perpendicular to the axis of fluid passage 7 and extend horizontally. Each of communication passages 10 extends in the opposite directions from fluid passage 7.

With each of communication passages 10 is connected hollow cylinder 11 of which axis is the same as that of each of communication passages 10.

Hollow cylinder 11 has plunger seat 11A that is cone-shaped and connected with each of communication passages 10. Of two hollow cylinders 11, one is crossed by eluent passage 12 that is perpendicular to the axis of the hollow cylinder and extends horizontally. For the introduction and discharge of an eluent, this cylinder box 5 has eluent inlet 13 for introducing the eluent into eluent passage 12 and eluent outlet 14 for discharging the eluent from eluent passage 12. Eluent passage 12 has eluent ring bypass 12A of which diameter is larger than that of hollow cylinder 11.

The other of two hollow cylinders 11 is crossed by extract passage 15 that is perpendicular to the axis of the hollow cylinder and extends horizontally. For the introduction and discharge of an extract, this cylinder box 5 has extract outlet 16 for discharging the extract from extract passage 15 and extract inlet 17 for introducing the extract into extract passage 15.

Extract passage 15 has extract ring bypass 15A of which diameter is larger than that of hollow cylinder 11.

As seen in FIG. 2, eluent inlet 13 and extract outlet 16 are made in one same face of cylinder box 5. Eluent outlet 14 (not shown in FIG. 2) and extract inlet 17 (not shown in FIG. 2) are made in another same face that is opposite to the one same face.

Since the lower cylinder box 5 has the same mechanical structure as the upper cylinder box 5, we will explain the lower cylinder box 5 referring to FIG. 3 that was used for explaining the upper cylinder box 5.

The lower cylinder box 5 has a pair of communication passages 10 that are perpendicular to the axis of fluid passage 7 and extend horizontally. Each of communication passages 10 extends in the opposite directions from fluid passage 7.

With each of communication passages 10 is connected hollow cylinder 11 of which axis is the same as that of each of communication passages 10.

Of two hollow cylinders 11, one is crossed by feedstock mixture passage 18 that is perpendicular to the axis of the hollow cylinder and extends horizontally. For the introduction and discharge of a feedstock mixture, this cylinder box 5 has feedstock mixture inlet 19 for introducing the feedstock mixture into feedstock mixture passage 18 and feedstock mixture outlet 20 for discharging the feedstock mixture from feedstock mixture passage 18.

Feedstock mixture passage 18 also has a ring bypass, similar to extract ring bypass 12A, of which diameter is larger than that of hollow cylinder 11.

The other of two hollow cylinders 11 is crossed by raffinate passage 21 that is perpendicular to the axis of the hollow cylinder and extends horizontally. For the introduction and discharge of a raffinate, this cylinder box 5 has raffinate inlet 22 for introducing the raffinate into raffinate passage 21 and raffinate outlet 23 for discharging the raffinate from raffinate passage 21.

Raffinate passage 21 also has a ring bypass, similar to extract ring bypass 15A, of which diameter is larger than that of hollow cylinder 11.

As seen in FIG. 2, feedstock mixture inlet 19 and raffinate outlet 23 are made in one same face of cylinder box 5. Feedstock mixture outlet 20 (not shown in FIG. 2) and raffinate inlet 22 (not shown in FIG. 2) are formed on another same face that is opposite to the one same face.

As shown in FIG. 3, into hollow cylinder 11 plunger 11B is fitted so that it is movable backward and forward in the cylinder. Plunger 11B is driven backward and forward by a solenoid of electromagnetic valve device 6 and plunger 11B is sealingly movable in the hollow cylinder. The tip of the plunger is cone-shaped so that the plunger can block the communication between communication passage 10 and the eluent, extract, feedstock mixture or raffinate passage when the plunger is inserted into the cylinder completely and the plunger tip is placed in the plunger seat of the cylinder.

When the plunger blocks the communication between communication passage 10 and the eluent, extract, feedstock mixture or raffinate passage, fluid such as eluent, extract, feedstock mixture or raffinate can flow through eluent passage 13, extract passage 15, feed stock mixture passage 19 or raffinate passage 21 by detouring around the blocked part via a ring bypass such as eluent ring bypass 12A or extract ring bypass 15A.

Plungers 11B fitted into respective hollow cylinders 11 in cylinder boxes 5 function as a valve element of the eluent valve that opens or closes communication passage 10 connecting fluid passage 7 with eluent passage 12, that of the extract valve that opens or closes communication passage 10 connecting fluid passage 7 with extract passage 15, that of the feedstock mixture valve that opens or closes communication passage 10 connecting fluid passage 7 with feedstock mixture passage 18, and that of a raffinate valve that opens or closes communication passage 10 connecting fluid passage 7 with raffinate passage 21. These valves are on-off valves and therefore, unlike rotary valves, do not increase the inner pressure of the circulation passage extraordinarily when the valves are changed over, which leads to a stable operation of the system.

This invention is not limited by the combination of hollow cylinder 11 and plunger 11B, as long as the same function is assured. Various embodiments can be employed for achieving the purposes of the invention.

The structure of tail-end valve-device 4C is the same as that of the other valve devices, except that in the upper cylinder box 5 the passage for introducing the eluent is a cul-de-sac passage, a passage one end of which is closed with end stopper 24A, which is named eluent cul-de-sac passage 12B, and the passage for drawing out the extract is also a cul-de-sac one, a passage one end of which is closed, which is named extract cul-de-sac passage 15B; in the lower cylinder box 5 the passage for introducing the feedstock mixture is a cul-de-sac passage, a passage one end of which is closed with an end stopper, which is named feedstock mixture cul-de-sac passage 18B, and the passage for drawing out the raffinate is also a cul-de-sac one, a passage one end of which is closed with end stopper 24A, which is named raffinate cul-de-sac passage 21B.

In tail-end valve device, plungers 11B that are sealingly fitted into respective hollow cylinders 11 and are movable backward and forward therein function as a valve element that opens or closes communication passage 10 connecting fluid passage 7 with eluent cul-de-sac passage 12B, as a valve element that opens or closes communication passage 10 connecting fluid passage 7 with extract cul-de-sac passage 15B, as a valve element that opens or closes communication passage 10 connecting fluid passage 7 with feedstock mixture cul-de-sac passage 18B, and as a valve element that opens or closes communication passage 10 connecting fluid passage 7 with raffinate cul-de-sac passage 21B.

Four valve devices 4 for each of two units 2, and unit columns 3 are connected in the following ways. We will call one of the units the first unit 2A and the other the second unit 2B.

As seen in FIG. 1, in the first unit 2A spearhead valve device 4A is named the first valve device 4-1, one of middle valve devices 4B the third valve device 4-3, the other of middle valve devices 4B the fifth valve device 4-5, and tail-end valve device 4C the seventh valve device 4-7. In the second unit 2B spearhead valve device 4A is named the second valve device 4-2, one of middle valve devices 4B the fourth valve device 4-4, the other of middle valve devices 4B the sixth valve device 4-6, and tail-end valve device 4C the eighth valve device 4-8. For convenience, eight unit columns 3 are also named the first unit column 3-1, the second unit column 3-2 and so on.

As shown in FIG. 1, the circulation fluid outlet of the first valve device 4-1 is connected with the inlet of the first unit column 3-1, the outlet of the first unit column 3-1 with circulation fluid inlet 8 of the second valve device 4-2, the circulation fluid outlet of the second valve device 4-2 with the inlet of the second unit column 3-2, and the outlet of the second unit column 3-2 with circulation fluid inlet 8 of the third valve device 4-3. In the same way, the respective circulation fluid outlets of valve devices 4 are connected with the respective inlets of unit columns 3, the respective outlets of unit columns 3 with the respective circulation fluid inlets 8 of valve devices 4, and the outlet of the eighth unit column 3-8 with circulation fluid inlet 8 of the first valve device 4-1.

Thus, each of fluid passages 7 of valve devices 4 and each of unit columns are connected alternately in series to form an endless circulation passage.

In the conduit connecting the outlet of the eighth unit column 3-8 with the circulation fluid inlet of the first valve device 4-1, a circulation pump (not shown) is placed. By this circulation pump the circulation fluid is forced to flow and circulate through the circulation passage.

For the circulation pump is preferred a pump that can set the amount of fluid flowing therethrough. The adjustment of the amount of fluid flowing through the circulation passage by the pump can enhance the operation stability of simulated moving bed apparatus 1. To achieve this purpose is preferred the employment of a plunger pump. The use of a double plunger pump is further preferable. Sending out fluid forcibly with a plunger pump does not cause a pulsation in the circulation passage and therefore improves the operation stability of the apparatus. In addition, because the employment of a double plunger pump makes the dead space smaller compared with that of a diaphragm pump that has been used as a circulation pump. Consequently, the separation efficiency is also improved. It should be noted that the circulation pump must be a pressure proof pump that can withstand pressures up to 100 kg/cm$^2$.

In the first unit 2A, eluent outlet 14 of the first valve device 4-1, eluent outlet 14 of the third valve device 4-3, and eluent outlet 14 of the fifth valve device 4-5 are respectively connected with eluent inlet 13 of the third valve device 4-3, eluent inlet 13 of the fifth valve device 4-5, and eluent inlet 13 of the seventh valve device 4-7 so that the eluent can flow through the connected passage. Consequently, one cul-de-sac passage, which corresponds to the eluent feeding cul-de-sac passage, from eluent passage 12 of the first valve device 4-1 to eluent cul-de-sac passage 12B of the seventh valve device 4-7 is formed.

Similarly, the first valve device 4-1, the third valve device 4-3, the fifth valve device 4-5 and the seventh valve device 4-7 have another cul-de-sac passage, which is the extract draw-out cul-de-sac passage, formed from extract passage 15 of the first valve device 4-1 through extract cul-de-sac passage 15B of the seventh valve device 4-7. From feedstock mixture passage 18 of the first valve device through feedstock mixture cul-de-sac passage 18B of the seventh valve device is formed in the same way still another cul-de-sac passage, the feedstock mixture feeding cul-de-sac passage. Also, from raffinate passage 21 of the first valve device through raffinate cul-de-sac passage 21B of the seventh valve device is formed yet another cul-de-sac passage, i.e. the raffinate draw-out cul-de-sac passage.

Also, in the second unit 2B, in the same way as in the first unit 2A, eluent outlet 14 of the second valve device 4-2, eluent outlet 14 of the fourth valve device 4-4, and eluent outlet 14 of the sixth valve device 4-6 are respectively connected with eluent inlet 13 of the fourth valve device 4-4, eluent inlet 13 of the sixth valve device 4-8, and eluent inlet 13 of the eighth valve device 4-8 so that the eluent can flow through the connected passage. Consequently, one cul-de-sac passage, which corresponds to the eluent feeding cul-de-sac passage, from eluent passage 12 of the second valve device 4-2 to eluent cul-de-sac passage 12B of the eighth valve device 4-8 is formed.

Similarly, the second valve device 4-2, the fourth valve device 4-4, the sixth valve device 4-6 and the eighth valve device 4-8 have another cul-de-sac passage, which is the raffinate draw-out cul-de-sac passage, formed from raffinate passage 21 of the second valve device 4-2 through raffinate cul-de-sac passage 21B of the eighth valve device 4-8. From feedstock mixture passage 18 of the second valve device through feedstock mixture cul-de-sac passage 18B of the eighth valve device 4-8 is formed in the same way still another cul-de-sac passage, the feedstock mixture feeding cul-de-sac passage. Also, from extract passage 15 of the second valve device through extract cul-de-sac passage 15B of the eighth valve device is formed yet another cul-de-sac passage, i.e. the extract draw-out cul-de-sac passage.

Thus, in the first unit 2A, the first valve device 4-1, the third valve device 4-3, the fifth valve device 4-5 and the seventh valve device 4-7 share one eluent feeding cul-de-sac passage, one extract draw-out cul-de-sac passage, one feedstock mixture feeding cul-de-sac passage and one raffinate draw-out cul-de-sac passage. The second unit 2B has the same structure.

In the first and second units 2A and 2B, the valve devices are placed adjacently from each other. Consequently, the total length of the eluent feeding cul-de-sac passage, that of the extract draw-out cul-de-sac passage, that of the feedstock mixture feeding cul-de-sac passage and that of the raffinate draw-out cul-de-sac passage can be shortened, which results in a reduction in Vs value.

Since in each of the first and second units 2A and 2B the valve devices have one common eluent feeding cul-de-sac passage, one common extract draw-out cul-de-sac passage, one common feedstock mixture feeding cul-de-sac passage and one common raffinate draw-out cul-de-sac passage, the length of each of the communication passages, which connects each of the cul-de-sac passages with the circulation passage, can be shortened. This structure can make the dead space minimum and then Vs value smaller. Further, an extract and raffinate contaminated little with the remaining fluid of the former operation can be obtained. In other words, separation with high purity can be carried out.

As explained above, since the valve devices are incorporated into the units by a close arrangement thereof, the length of each of the cul-de-sac passages can be shortened. As a result, can be reduced the ratio of Vs/Vc as well as the whole size of the simulated moving bed apparatus.

The eluent feeding cul-de-sac passage of the first unit 2A and that of the second unit 2B are integrated and then connected with an eluent feeding device (not shown in the figures). This eluent feeding device comprises an eluent tank (not shown) that stores the eluent and an eluent pump (not shown) that sends the eluent to the eluent feeding cul-de-sac passage.

For the eluent pump is preferred a pump that is capable of adjusting the amount of flux. The direct control of flux by the pump can keep a stable operation better than an indirect control of flux by changing the pressure. The latter method was typically used in conventional simulated moving bed apparatuses. Of such pumps is recommended the employment of a double plunger pump for the eluent pump. When a double plunger pump is used, each plunger should work alternately so that the pump does not cause pulsation. This operation prevents the pump from a pulsed sending of the eluent.

Similarly, the extract draw-out cul-de-sac passage of the first unit 2A and that of the second unit 2B are integrated and then connected with an extract draw-out device (not shown in the figures). This extract draw-out device comprises an extract tank (not shown) that stores the extract and an extract pump (not shown) that draws out the extract from the extract draw-out cul-de-sac passage. For the extract pump, like the eluent pump, is preferred a double plunger pump.

The feedstock mixture feeding cul-de-sac passage of the first unit 2A and that of the second unit 2B are integrated and then connected with a feedstock mixture feeding device (not shown in the figures). This feedstock mixture feeding device comprises a feedstock mixture tank (not shown) that stores the feedstock mixture and a feedstock mixture pump (not shown) that sends the feedstock mixture to the feedstock mixture feeding cul-de-sac passage.

For the feedstock mixture pump, like the eluent pump, is preferred a pump that is capable of adjusting the amount of flux. The preferable pump includes a double plunger pump.

Similarly, the raffinate draw-out cul-de-sac passage of the first unit 2A and that of the second unit 2B are integrated and then connected with a raffinate draw-out device (not shown in the figures). This raffinate draw-out device comprises a raffinate tank (not shown) that stores the raffinate and a raffinate pump (not shown) that draws out the raffinate from the raffinate draw-out cul-de-sac passage.

For the raffinate pump, like the eluent pump, is preferred a pump that is capable of adjusting the amount of flux. The preferable pump includes a double plunger pump.

In order to make simulated moving bed apparatus 1 ultra-compact, a unit column 3 preferably has a content volume of not more than 7.85 cm$^3$ (inner diameter: 1 cm, length: 10 cm). When unit columns each having an inner diameter of about 1 cm and a length of about 10 cm are employed, the components can be assembled into a compact simulated moving bed apparatus; it is 1 m in length, 1 m in width and 1 m in height at the most. With this assembled ultra-compact apparatus can be separated with high purity a sample of such a small amount as a laboratory-scale one.

Each of unit columns 3 is packed with a filler that is capable of adsorbing a component to be separated.

For the filler may be used known various isomeric fillers. For example, optical isomers may be separated using a high molecular weight compound having an optical activity or a low molecular weight compound having an optical resolution function. The optically active high molecular weight compound filler may be comprised of, for example, silica gel carrier-supported polysaccharide derivatives (esters or carbamates of cellulose or amylose), polyacrylate derivatives or polyamide derivatives; or the above-mentioned compounds not supported on the silica gel but formed in beads. The low molecular weight compound filler having the optical resolution function may be comprised of, for example, crown ether or derivatives thereof, or cyclodextrin or derivatives thereof. These low molecular weight compounds are typically used with being supported on a carrier such as silica gel.

The compound fillers having the optical resolution function may be commercially available. The following products made by Daicel Chemical Industries, Ltd. may preferably be used: CHIRALCEL OB, CHIRALCEL OD, CROWNPAK CR(+), CHIRALCEL CA-1, CHIRALCEL OA, CHIRALCEL OK, CHIRALCEL OJ, CHIRALCEL OC, CHIRALCEL OF, CHIRALCEL OG, CHIRALPAK WH, CHIRALPAK WM, CHIRALPAK WE, CHIRALPAK OT(+), CHIRALPAK OP(+), CHIRALPAK AS, and CHIRALPAK AD (all registered trademarks).

In an example of dividing an oligosaccharide-containing isomeric sugar into fructose and glucose, e.g., separating oligosaccharide or monosaccharide from a mixture thereof, the filler may be an ion-exchange resin for salts of a strongly acidic alkaline earth metal such as calcium, barium or strontium, or a crystallized alumino silicate, such as Zeolite Y, of which exchangeable cations are replaced with ammonium, sodium, potassium, calcium, strontium, barium or the like.

In an example of separating a fatty acid and triglyceride, a basic ion-exchange resin comprising a skeleton of a copolymer of styrene and divinylbenzene may be used. As commercially available products, reference may be made to a weakly basic ion exchange resin such as Amberlite IRA93 made by Rohm and Haas, or Duolite A377 made by Sumitomo Chemical Co., Ltd., or a strongly basic exchange resin such as Amberlite IRA400 made by Rohm and Haas, or Duolite A161 made by Sumitomo Chemical Co., Ltd.

Other fillers that are considered to be suitable for the separation of various substances may be used.

The average particle size of the filler packed in the columns varies depending upon the kind of constituents to be separated and the volume flow rate of a medium flowing through each of the columns. It is normally 1 to 100 $\mu$m, preferably 5 to 75 $\mu$m. For maintaining the pressure loss in the columns at a low level, the average particle size should preferably be adjusted within a range of 15 to 75 $\mu$m. If the average particle size is adjusted within the range, the pressure loss in a column can be maintained at a lower level, for example, 10 kgf/cm$^2$ or less. On the other hand, the theoretical number of stages is decreased as the average particle size of the filler becomes larger. Therefore, for only achieving a practically working theoretical number of stages, the average particle size is normally 1 to 50 $\mu$m.

For the eluent fed to the circulation passage may be used alcohols such as methanol, ethanol or isopropanol, organic solvents such as hydrocarbons including hexane, and aqueous solutions containing salts such as aqueous copper sulfate or an aqueous perchlorate. The eluent is suitably selected depending on the substances to be separated or the kind of compounds.

There are no limitations on the feedstock mixture. For example, materials to be used in pharmaceuticals, drugs, foodstuffs, animal-feeding stuffs or perfumes may be used. Such materials include thalidomide, which is a pharmaceutical, EPN, which is an organic phosphor-based agrochemical monosodium glutamate, a synthetic flavoring material or menthol, which is a perfume, and also optically active alcohols and esters.

In addition to the above-mentioned, a mixture of compounds of which boiling points are close to each other, such as a mixture of n-hexane and cyclohexane, or that of a normal compound and its isomeric compounds, which compounds fall under hydrocarbons, alcohols, aldehydes, ketones, etc. may be separated with the simulated moving bed apparatus of the invention. Also, an aqueous solution containing dextrose and D-fructose, and a mixture of maltose and polysaccharides having a molecular weight higher than the molecular weight of maltotriose may be subjected to the separation using the apparatus in accordance with the invention.

In order to make this simulated moving bed apparatus 1 compact, the respective sizes of each valve device 4, each unit column 3, each passage, etc. should be decided so that the ratio of sum Vc of the respective content volumes of the unit columns to sum Vs of the content volumes of the filler-nonexistent fluid flowable spaces in simulated moving bed apparatus 1, for example, the content volumes of all the passages and those of the pumps, is not more than 18%. When the content volume of unit column 3 is 7.85 cm$^3$ (where the column is 1 cm in inner diameter and 10 cm in length), the percentage of Vs/Vc is 5%.

The operation of simulated moving bed apparatus 1 through controlling each valve device 4 by a controlling device is carried out in the following ways.

The controlling device excites one of the solenoids in the first valve device 4-1 to draw back plunger 11B, which makes fluid passage 7 and eluent passage 12 communicate with each other. At the same time, the controlling device degausses another solenoid in the first valve device 4-1 to drive plunger 11B forward, which blocks the communication between raffinate passage 21 and fluid passage 7. Similarly, the controlling device makes plungers 11B go forward to respectively block the communication between extract passage 15 and fluid passage 7 and that between feedstock mixture passage 18 and fluid passage 7.

The controlling device degausses one of the solenoids in the third valve device 4-3 to drive plunger 11B forward, which blocks the communication between eluent passage 12 and fluid passage 7. At the same time, the controlling device excites another solenoid in the device to draw back plunger 11B, which makes extract passage 15 and fluid passage 7 communicate with each other. Similarly, it makes plungers 11B go forward to respectively block the communication between raffinate passage 21 and fluid passage 7 and that between feedstock mixture passage 18 and fluid passage 7.

The controlling device excites one of the solenoids in the fifth valve device 4-5 to draw back plunger 11B, which makes fluid passage 7 and feedstock mixture passage 18 communicate with each other. At the same time, the controlling device degausses another solenoid in the device 4-5 to drive plunger 11B forward, which blocks the communication between raffinate passage 21 and fluid passage 7. Similarly, the controlling device makes plungers 11B go forward to respectively block the communication between eluent passage 12 and fluid passage 7 and that between extract passage 18 and fluid passage 7.

The controlling device excites one of the solenoids in the seventh valve device 4-7 to draw back plunger 11B, which makes fluid passage 7 and raffinate passage 21 communicate with each other. At the same time, the controlling device degausses another solenoid in the device 4-7 to drive plunger 11B forward, which blocks the communication between feedstock mixture passage 18 and fluid passage 7. Similarly, the controlling device makes plungers 11B go forward to respectively block the communication between eluent passage 12 and fluid passage 7 and that between extract passage 15 and fluid passage 7.

In the second unit 2B, in each of the second, fourth, sixth and eighth valve devices 4-2, 4-4, 4-6, 4-8, the controlling device degausses the solenoids to drive plungers 11B forward for blocking the communication between fluid passage 7 and eluent passage 12, that between fluid passage 7 and extract passage 15, that between fluid passage 7 and feedstock mixture passage 18, and that between fluid passage 7 and raffinate passage 21.

When the position for introducing the eluent, that for drawing out the extract, that for introducing the feedstock mixture, and that for drawing out the raffinate are decided in this way, an adsorbing zone (zone I) is formed in the seventh unit column 3-7 and the eighth unit column 3-8, which are located between the position for introducing the feedstock mixture and that for drawing out the raffinate; a refining zone (zone II) is formed in the sixth unit column 3-6 and the fifth unit column 3-5, which are located between the position for drawing out the raffinate and that for introducing the feedstock mixture; a concentrating zone (zone III) is formed in the fourth unit column 3-4 and the third unit column 3-3, which are located between the position for introducing the feedstock mixture and that for drawing out the extract; a desorbing zone (zone IV) is formed in the second unit column 3-2 and the first unit column 3-1, which are located between the position for drawing out the extract and that for introducing the eluent.

Then, while the circulation fluid is being forced to flow through the circulation passage by the circulation pump, the eluent is introduced into fluid passage 7 from eluent inlet 13 in the first valve device 4-1, and the feedstock mixture into fluid passage 7 from feedstock mixture inlet 19 in the fifth valve device 4-5.

After a predetermined period of time elapsed, the controlling device shifts the respective positions for introducing the eluent, drawing out the extract, introducing the feedstock mixture and drawing out the raffinate by the unit column. Specifically, the controlling device blocks the communication between eluent passage 12 and fluid passage 7 in the first valve device 4-1, and opens the communication between eluent passage 12 and fluid passage 7 in the second valve device 4-2; blocks the communication between fluid passage 7 and extract passage 15 in the third device 4-3, and opens the communication between fluid passage 7 and extract passage 15 in the fourth valve device 4-4; blocks the communication between fluid passage 7 and feedstock mixture passage 18 in the fifth valve device 4-5, and opens the communication between fluid passage 7 and feedstock mixture passage 18 in the sixth valve device 4-6; and blocks the communication between fluid passage 7 and raffinate passage 21 in the seventh device, and opens the communication between fluid passage 7 and raffinate passage 21 in the eighth valve device.

Thus, at predetermined intervals the controlling device shifts the respective positions for introducing the eluent, drawing out the extract, introducing the feedstock mixture and drawing out the raffinate by the unit column.

As a result of this operation, in the adsorbing zone, the feedstock mixture, for example a racemic mixture, is contacted with an optical resolution filler, and then an optically active substance that is easily adsorbed on the filler (strongly adsorbable substance) is adsorbed while the other optically active substance that is difficult to be adsorbed on the filler (weakly adsorbable substance) is recovered as a raffinate together with the eluent from raffinate outlet 23 by the raffinate draw-out device.

In the refining zone, the optical resolution filler that has adsorbed the strongly adsorbable substance is contacted with a part of the extract, which we will explain hereafter, and then the weakly adsorbable substance remaining on the filler is expelled, which leads to a concentration of the strongly adsorbable substance.

In the concentrating zone, the filler having thereon the concentrated strongly adsorbable substance is contacted with the eluent to expel the strongly adsorbable substance from the filler. The expelled substance is discharged as an extract together with the eluent from extract outlet 16 into the extract draw-out device.

In the desorbing zone, the filler that has substantially only the eluent thereon is contacted with a part of the raffinate, and then a part of the adsorbed eluent is recovered. This process is substantially carried out in the unit columns 3 located after the position for drawing out the extract and before that for introducing the eluent.

One embodiment of the invention has been explained so far. Needless to say, the invention is not limited to this embodiment only but can be worked with suitable modification within the scope of the gist of the invention.

For example, the number of the unit columns is selected at the user's discretion as long as the four zones can be formed in the system. The number of the valve devices corresponds to the number of the columns. The number of the units may be one into which all of the valve devices are incorporated.

This invention allows engineers to design an ultra-compact simulated moving bed apparatus that measures 1 m or less in length, 1 m or less in width and 1 m or less in height. Since the volume of the fluid flowable space is minimized in such an ultra-compact apparatus, a stable operation can be achieved and if the conditions of the operation are changed the apparatus regain a stability of operation in a short time. Further, the apparatus can separate components with high purity. Thus, this invention can provide an ultra-compact simulated moving bed apparatus also excellent in separation efficiency.

We claim:

1. A simulated moving bed apparatus which comprises:
    a circulation passage formed by plural unit columns that are connected in series to each other endlessly via a conduit for allowing unidirectional circulation of a circulation fluid through the connected filler unit columns by a circulation pump;
    an eluent feeding cul-de-sac passage for feeding an eluent to said circulation passage;
    a feedstock mixture feeding cul-de-sac passage for feeding a feedstock mixture to said circulation passage;
    a raffinate draw-out cul-de-sac passage for drawing out a raffinate from said circulation passage;
    an extract draw-out cul-de-sac passage for drawing out an extract from said circulation passage;
    plural valve devices, each comprising an eluent valve which opens or closes a first communication passage that connects said eluent feeding cul-de-sac passage with said circulation passage, an extract valve which opens or closes a second communication passage that connects said extract draw-out cul-de-sac passage with said circulation passage, a feedstock mixture valve which opens or closes a third communication passage that connects said feedstock mixture feeding cul-de-sac passage with said circulation passage, and a raffinate valve which opens or closes a fourth communication passage that connects said raffinate draw-out cul-de-sac passage with said circulation passage, wherein each of said unit columns is provided with each of said valve devices; and
    a control device which controls opening and closing motions of said feedstock mixture valve, said eluent valve, said extract valve and said raffinate valve so that a position for introducing said eluent, a position for drawing out said extract, a position for introducing said feedstock mixture and a position for drawing out said raffinate are successively moved in a direction of the fluid flow intermittently.

2. The simulated moving bed apparatus according to claim 1 wherein said plural valve devices are each provided with fluid passages connected with said first, second, third and fourth communication passages, wherein said fluid passages form part of said circulation passage.

3. The simulated moving bed apparatus according to claim 1 wherein said valve devices are incorporated into one or more units so that all of the valve devices communicate with the same one eluent feeding cul-de-sac passage, one feedstock mixture feeding cul-de-sac passage, one raffinate draw-out cul-de-sac passage and one extract draw-out cul-de-sac passage.

4. The simulated moving bed apparatus according to claim 1 wherein said plural valve devices are grouped and incorporated into two units so that every other valve device along said circulation passage is grouped into one of the two units, wherein all of the valve devices in the same group communicate with the same one eluent feeding cul-de-sac passage, one feedstock mixture feeding cul-de-sac passage, one raffinate draw-out cul-de-sac passage and one extract draw-out cul-de-sac passage.

5. The simulated moving bed apparatus according to claim 1 wherein each of said valve devices respectively comprises an eluent passage that forms a part of said eluent feeding cul-de-sac passage, an extract passage that forms a part of said extract draw-out cul-de-sac passage, a feedstock mixture passage that forms a part of said feedstock mixture feeding cul-de-sac passage and a raffinate passage that forms a part of raffinate draw-out cul-de-sac passage; and said eluent valve comprises a first valve element that is capable of opening and closing said first communication passage and does not close said eluent passage when said first communication passage is closed, said extract valve comprises a second valve element that is capable of opening and closing said second communication passage and does not close said extract passage when said second communication passage is closed, said feedstock mixture valve comprises a third valve element that is capable of opening and closing said third communication passage and does not close said feedstock mixture passage when said third communication passage is closed, and said raffinate valve comprises a fourth valve element that is capable of opening and closing said fourth communication passage and does not close said raffinate passage when said fourth communication passage is closed.

6. The simulated moving bed apparatus according to claim 5 wherein each of said valve devices includes:

a first hollow cylinder communicating with said first communication passage and said eluent passage respectively, and a first plunger sealingly fitting into said first hollow cylinder, said first plunger being movable backward and forward therein;

a second hollow cylinder communicating with said second communication passage and said extract passage respectively, and a second plunger sealingly fitting into said second hollow cylinder, said second plunger being movable backward and forward therein;

a third hollow cylinder communicating with said third communication passage and said feedstock mixture passage respectively, and a third plunger sealingly fitting into said third hollow cylinder, said third plunger being movable backward and forward therein; and a fourth hollow cylinder communicating with said fourth communication passage and said raffinate passage respectively, and a fourth plunger sealingly fitting into said fourth hollow cylinder, said fourth plunger being movable backward and forward therein.

7. The simulated moving bed apparatus according to claim 1 wherein said circulation pump is a pump for circulating the circulation fluid and the amount of flowing fluid through said pump can be set; said eluent feeding cul-de-sac passage is connected with an eluent pump for feeding said eluent and of which amount of outflowing said eluent can be set; said extract draw-out passage is connected with an extract pump for drawing out said extract and of which amount of inflowing said extract can be set; said feedstock mixture feeding cul-de-sac passage is connected with a feedstock mixture pump for feeding said feedstock mixture and of which amount of outflowing said feedstock mixture can be set; and said raffinate draw-out passage is connected with a raffinate pump for drawing out said raffinate and of which amount of inflowing said raffinate can be set.

8. The simulated moving bed apparatus according to claim 7 wherein said circulation pump, said eluent pump, said extract pump, said feedstock mixture pump and said raffinate pump are double plunger pumps.

9. The simulated moving bed apparatus according to claim 1 wherein said apparatus measures 1 m or less in height, 1 m less in width, and 1 m or less in length.

* * * * *